Figures 1, 2:
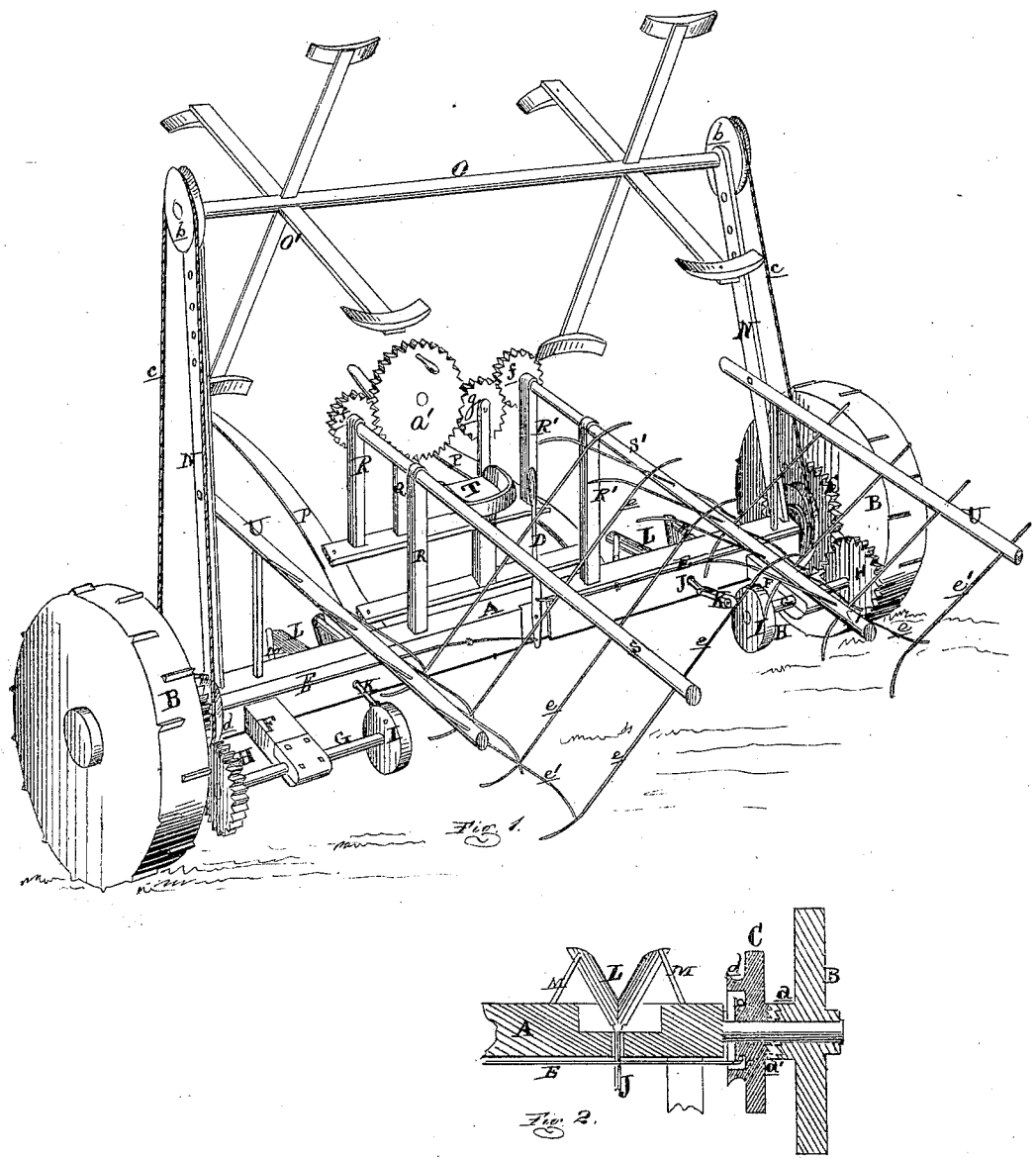

A. N. WOODARD.
Improvement in Corn-Harvesters.

No. 114,076.　　　　　　　　　　　　　　Patented April 25, 1871.

ATTEST　　　　　　　　　　　　　　　　　　　　INVENTOR
Frederick Eberts　　　　　　　　　　　　　　　Alvin N. Woodard
　　　　　　　　　　　　　　　　　　　　　　　per Attorney

UNITED STATES PATENT OFFICE.

ALVIN N. WOODARD, OF FENTONVILLE, MICHIGAN.

IMPROVEMENT IN CORN-HARVESTERS.

Specification forming part of Letters Patent No. 114,076, dated April 25, 1871.

*To whom it may concern:*

Be it known that I, ALVIN N. WOODARD, of Fentonville, in the county of Genesee and State of Michigan, have invented a new and useful Improvement in Corn-Reapers; and I do declare that the following is a true and accurate description thereof, reference being had to the accompanying drawing, and to the letters of reference marked thereon, and being a part of this specification, in which—

Figure 1 is a perspective view of my machine from the rear side, and Fig. 2 is a horizontal section through one end of the axle, showing the clutch for throwing the mechanism in and out of gear with the traction-wheel.

Like letters indicate like parts in each figure.

The nature of this invention relates to the construction of a machine for harvesting standing corn, operating upon two rows at a time.

The invention consists in the peculiar construction and arrangement of a pair of V-shaped knives in the axle, receiving a reciprocating motion from the traction-wheels through suitable gearing, which also give motion to a reel which throws back the tops of the stalks, as more fully hereinafter described.

In the drawing, A represents an axle, upon the ends of which the traction-wheels B rotate, the inner faces of their hubs being provided with a clutch-gear, $a$. Upon each axle-arm also rotates a spur-wheel, C, also provided with a clutch-gear, $a'$, to engage with that on the traction-wheel. These wheels C slide freely on the axle-arm, and are simultaneously thrown in and out of gear with the traction-wheels by the lever D and clutch-rods E.

F are brackets projecting rearward from the axle. In each is journaled a shaft, G, carrying at one end a pinion, H, meshing with the spur-wheel C, and at the other a crank-wheel, I, giving a reciprocating movement to the rod J through the connecting-rod K, said rod J playing through a horizontal slot in the axle, and carrying at its front end the V-shaped knives L, working between guides M, as shown.

Each pair of knives is at a distance of four feet from the other, the general width between the rows of corn, so that one or the other of the knives of each pair will shear the stalks as they approach them.

N are standards erected on the axle, and having journaled at the top the reel-shaft O, provided with reel O', and at the end with pulleys $b$, rotated by belts $c$, passing around pulleys $d$ on the spur-gears C.

On the shafts P, attached to the axle, and in which the horse is hitched to draw the implement, is erected a standard, Q, in which is journaled a cranked spur-wheel, Q'.

On the axle and shafts are erected other standards, R R', in which are journaled shafts S S', carrying a series of reel-rods, $e'$.

On the front ends of the shafts S S' are pinions $f f$, rotated by the spur-gear Q', the latter, through an intermediate gear, $g$, journaled in a suitable standard on the shafts P. In the rear of the gear Q' is the driver's seat T.

U are rods attached to and projecting to the rear from the reel-standards, and are provided with a series of reel-rods, $e'$, projecting toward those of the shafts S S', and forming with them a receptacle for the corn cut and falling therein.

Whenever sufficient corn is gathered in them to form shocks, the driver, through the gear Q', gives the shafts S S' a half-revolution, which dumps the corn and brings the opposite series of reel-rods around to form a similar receptacle for the corn. If a single horse be not able to draw the implement, another may be driven tandem ahead of the one in the shafts or thills.

What I claim as my invention, and desire to secure by Letters Patent, is—

The combination and arrangement of the V-shaped knives L, rods J, connecting-rods K, shafts G, cranked wheels I, brackets F, pinions H, and spur-wheels C, substantially as and for the purpose set forth.

ALVIN N. WOODARD.

Witnesses:
W. P. GUEST,
WILLIAM R. MARSH.